United States Patent
Amaral

(10) Patent No.: US 12,333,608 B2
(45) Date of Patent: Jun. 17, 2025

(54) SYSTEMS AND METHODS FOR VERIFYING ASSET MANAGEMENT PERFORMANCE

(71) Applicant: Sergio Amaral, Chappaqua, NY (US)

(72) Inventor: Sergio Amaral, Chappaqua, NY (US)

(*) Notice: Subject to any disclaimer, the term of this patent is extended or adjusted under 35 U.S.C. 154(b) by 0 days.

(21) Appl. No.: 18/829,683

(22) Filed: Sep. 10, 2024

(65) Prior Publication Data

US 2025/0086725 A1    Mar. 13, 2025

Related U.S. Application Data

(60) Provisional application No. 63/537,817, filed on Sep. 11, 2023.

(51) Int. Cl.
    *G06Q 40/06*    (2012.01)
    *H04L 9/00*     (2022.01)
    *H04L 9/06*     (2006.01)

(52) U.S. Cl.
    CPC ........... *G06Q 40/06* (2013.01); *H04L 9/0643* (2013.01); *H04L 9/50* (2022.05); *H04L 2209/56* (2013.01)

(58) Field of Classification Search
    USPC ........................................................ 705/36
    See application file for complete search history.

(56) References Cited

U.S. PATENT DOCUMENTS

| | | | | |
|---|---|---|---|---|
| 10,339,299 | B1* | 7/2019 | Magnuson et al. | G06F 21/52 |
| 11,113,241 | B1* | 9/2021 | Winarski | G06F 16/168 |
| 11,550,931 | B1* | 1/2023 | Dintchev et al. | G06F 21/602 |
| 11,720,549 | B1* | 8/2023 | McKervey et al. | G06F 16/2379 |
| 2003/0126056 | A1* | 7/2003 | Hausman et al. | 705/36 |
| 2018/0101701 | A1* | 4/2018 | Barinov et al. | G06F 21/64 |
| 2019/0379531 | A1* | 12/2019 | Aleksander et al. | H04L 9/0637 |
| 2020/0151709 | A1* | 5/2020 | Bryan | G06Q 20/3878 |
| 2020/0311723 | A1* | 10/2020 | Miller et al. | G06Q 20/389 |
| 2020/0349532 | A1* | 11/2020 | Brown et al. | G06Q 20/065 |
| 2021/0352142 | A1* | 11/2021 | Jayaram et al. | H04L 67/1091 |

(Continued)

OTHER PUBLICATIONS

Epiphaniou et al., Electronic Regulation of Data Sharing and Processing Using Smart Ledger Technologies for Supply-Chain Security, Nov. 4, 2020, IEEE Transactions on Engineering Management, vol. 67, No. 4, pp. 1059-1073. (Year: 2020).*

(Continued)

*Primary Examiner* — Bennett M Sigmond
*Assistant Examiner* — George N. Proios
(74) *Attorney, Agent, or Firm* — Outlier Patent Attorneys, PLLC

(57) ABSTRACT

This disclosure relates to systems and methods for verifying asset management performance. The method involves algorithmically obtaining key data, such as a name identifier, portfolio identifier, research data, type, and a file containing portfolio details. This data is encrypted, and the file is hashed using a hashing algorithm to create a unique file hash. The method then creates an entry in a distributed ledger that includes the file hash at a specific time. Later, the same file can be received and verified by a second party comparing its hash to the ledger entry to establish its authenticity. The verified file, its status, and the initial time of entry are then displayed on a screen. This process can be repeated multiple times to maintain a live, continuous track record of the portfolio's performance over time, ensuring accuracy and transparency.

20 Claims, 12 Drawing Sheets

(56) References Cited

U.S. PATENT DOCUMENTS

2021/0374693 A1* 12/2021 La Salle .............. G06Q 20/065
2023/0049791 A1* 2/2023 Bunker, Jr. et al. . G06Q 40/025
2023/0376947 A1* 11/2023 Chayanam et al. ........................
                                                        G06Q 20/4014
2024/0046293 A1* 2/2024 Negron ................ G06Q 30/026

OTHER PUBLICATIONS

Lin et al., The Challenges of Existence, Status, and Value for Improving Blockchain, Dec. 19, 2018, IEEE Access, vol. 7, pp. 7747-7758. (Year: 2018).*
Saxena et al., TokenDoc: Source Authentication With a Hybrid Approach of Smart Contract and RNN-Based Models With AES Encryption, Jun. 30, 2023, IEEE Transactions on Engineering Management, vol. 71, pp. 12418-12432. (Year: 2023).*
International Search Report and Written Opinion by ISA/US of the counterpart PCT application No. PCT/US24/45925, dated Dec. 16, 2024.

* cited by examiner

SYSTEMS AND METHODS FOR VERIFYING ASSET MANAGEMENT PERFORMANCE

CROSS-REFERENCE TO RELATED APPLICATIONS

This application claims the benefit of U.S. Provisional Application 63/537,817 filed Sep. 11, 2023, titled "SYSTEM AND METHOD FOR VERIFYING ASSET MANAGEMENT PERFORMANCE," which is herein incorporated by reference in its entirety.

BACKGROUND

Field of the Art

The present disclosure is related generally to proving performance and more specifically to using a distributed ledger to preserve proof of asset management performance and user selections and notes.

Discussion of the State of the Art

Typically, a candidate for an asset management position will be expected to prove capabilities associated with the position. One way to prove capabilities is to show a track record, either to a potential employer or to a third party. However, the candidate may not want to show a track record that could reveal the candidate's proprietary information (e.g., quantitative model, trading strategy, etc.), as this could result in reduced bargaining power or alpha capture. The candidate may be concerned that during the hiring process, the potential employer may discover the candidate's proprietary information and steal it without compensation. The same concerns may exist for a seller of a trading strategy in marketing the trading strategy to a potential buyer. Additionally, the potential employer may be concerned that the candidate is fabricating the track record. What is needed are systems and methods that allow a user to verify and trust an asset management performance as authentic without revealing valuable information.

Current methods to prove capabilities involve expensive and time consuming audits provided by outside authorities. These audits are not financially accessible to a majority of candidates that may want to show their capabilities to potential employers. There exists a need for a safe and reliable way of providing verified information to an employer to prove a candidate has effective trading skills.

SUMMARY

The present invention overcomes these limitations by allowing a user to hash a file comprising a portfolio. A portfolio may comprise holdings, trades, convictions, signals, scores, or similar characteristics (e.g., properties, etc.). The hashed file may be added to a distributed ledger at a first time. At a second time, when a user chooses to grant access to the file to an interested party (e.g. knowledge of the contents of the portfolio is no longer valuable), the user may give the file to an interested party. The interested party may hash the file and compare the hashed file to the hashed file on the distributed ledger to verify that the user created the portfolio in the file stored in the distributed ledger at the first time. Any party with the file may self-verify the file using the systems and methods described herein.

Disclosed herein are systems and methods for verifying asset management performance. An example method may comprise algorithmically obtaining a name identifier, portfolio identifier, type, and file. The file may comprise portfolio information. The example method may comprise encrypting the name identifier, portfolio identifier, and type. The example method may comprise hashing the file using a hashing algorithm to obtain a file hash. In an alternate embodiment, the example method may receive the file hash instead of the file (e.g., a user may use the hashing algorithm to obtain the file hash and provide the file hash, etc.). The example method may comprise algorithmically creating an entry in a distributed ledger comprising the name identifier, the portfolio identifier, the type, and the file hash at a first time. One or more of the name identifier, the portfolio identifier, and the type may be encrypted. The example method may comprise algorithmically obtaining the file at a second time. The example method may comprise verifying the file obtained at the second time. The file obtained at the second time may be verified using the hashing algorithm and the entry in the distributed ledger to obtain a verification status. The example method may comprise causing the verified file, the verification status, and the first time to be displayed on a screen.

The type may indicate a type associated with the file. The type may comprise "assets" or a similar title and the file may comprise portfolio holdings. The type may comprise "trades" or a similar title and the file may comprise asset buys, sells, metadata and amounts. The metadata may comprise attribution data, strategy data, the strategy data may be associated with at least one trade. The type may comprise "signal" or a similar title and the file may comprise signals, such as quantitative signals, buy and/or sell signals, and/or signal information, such as a z-score, a p-value, etc. The name identifier may be a unique identifier associated with an account. The account may be associated with a user name, entity name, email address, social media account, etc. A name may be associated with the account. The portfolio identifier may be a unique identifier associated with a portfolio. The portfolio may comprise one or more files, including the file. The portfolio identifier may identify multiple files associated with the portfolio. The portfolio identifier may identify multiple file hashes associated with the portfolio. Some or all of the multiple file hashes may be associated with the file at different times. The portfolio identifier may comprise properties of the one or more files associated with the portfolio. The account may comprise multiple files. A name identifier may be associated with multiple portfolio identifiers. Algorithmically obtaining a name identifier, portfolio identifier, type, and file may comprise obtaining one or more of the name identifier, portfolio identifier, type, and file via a file upload interface. Algorithmically obtaining a name identifier, portfolio identifier, type, and file may comprise obtaining one or more of the name identifier, portfolio identifier, type, and file via a form. Algorithmically obtaining a name identifier, portfolio identifier, type, and file may comprise obtaining one or more of the name identifier, portfolio identifier, type, and file via a received email.

The type may comprise "target quantity" or a similar title and the file may comprise an "asset" or a similar column, an "instrument" or a similar column, a "target quantity" or a similar column, a "priority" or a similar column, etc. The type may comprise "current and trade quantity" or a similar title and the file may comprise an "asset" or a similar column, an "instrument" or a similar column, a "current quantity" or a similar column, a "trade quantity" or a similar column, a "priority" or a similar column, etc. The type may comprise "z-score", "signal", or a similar title and the file may comprise an "asset" or a similar column, an "instrument" or a similar column, a "signal" or a similar column, a "decay" or a similar column, a "priority" or a similar column, etc. The type may comprise "z-score with decay", "signal with decay", or a similar title and the file may comprise an "asset" or a similar column, an "instrument" or a similar column, a "signal" or a similar column, a "decay" or a similar column, a "priority" or a similar column, etc. The type may comprise "recommendation" or a similar title and the file may comprise an "asset" or a similar column, an "instrument" or a similar column, a "recommendation" or a similar column, a "priority" or a similar column, etc. Although specific type and column combinations are mentioned, any type and associated column combinations may be used. For example, any file type with associated columns that are common practice in trading may be used. Financial Information exchange (FIX) or other known protocols may be used in this application. Examples of file types that are common practice in trading may comprise types described above, types comprising market orders, types comprising limit orders, types comprising stop orders, types comprising stop-limit orders, types comprising trailing stop orders, etc. Examples of columns in file types that are common practice in trading may comprise columns described above, "urgency of fill," which may comprise "limit orders", "market orders", "normal fill," "fill immediately," "fill slow," other columns may comprise "good for today" or a similar column, "good-til-canceled" or a similar column, "immediate-or-cancel" or a similar column, "fill-or-kill" or a similar column, "all-or-none" or a similar column, "on open" or a similar column, "on close" or a similar column, etc.

A research report may be associated with the file. The research report may be hashed using the hashing algorithm to obtain a research report hash. The research report may comprise supplementary material. The research report may comprise an appendix file. The entry in the distributed ledger may comprise the research report hash.

Algorithmically creating an entry in a distributed ledger may comprise creating a smart contract in the distributed ledger. The smart contract may comprise global parameters, which may not be changed by a user, and local parameters, which may be changed by a user. The global parameters may be changed by a smart contract owner (e.g., an entity controlling the portfolio platform 140, etc.). The global parameters may comprise the name identifier, the portfolio identifier, and the type. The global parameters may comprise additional parameters. The global parameters may be encrypted. The local parameters may comprise the file hash. The local parameters may comprise the research report hash. The local parameters may comprise additional parameters. The first time data associated with a particular portfolio identifier are used to create an entry in a distributed ledger, a smart contract may be created and the global parameters may be set, along with the particular local parameters (e.g., file hash, research report hash, etc.) for the particular time. Subsequent times when data associated with a particular portfolio identifier are used to create an entry in a distributed ledger, local parameters may be added to the smart contract, wherein the local parameters may comprise a new file hash, a new research report hash, etc. associated with a new time. Subsequent times when data associated with a particular encrypted portfolio identifier are used to create an entry in a distributed ledger, local parameters may be updated in the smart contract, wherein the local parameters may comprise a new file hash, a new research report hash, etc. associated with a new time.

Algorithmically creating an entry in a distributed ledger may comprise creating a transaction in the distributed ledger. The transaction may comprise transaction identifier and a transaction message. The transaction message may comprise the name identifier, the portfolio identifier, the type. The transaction message may comprise the file hash. The transaction message may comprise the research report hash. One or more of the name identifier, the portfolio identifier, and the type may be encrypted.

The first entry time may be recorded using a timestamp. The timestamp may be provided by the blockchain. The timestamp may comprise a trusted timestamp. The timestamp may comprise an identifier associated with a blockchain. The identifier associated with a blockchain may be a block identifier. The identifier associated with a blockchain may be a transaction identifier. The timestamp may be recorded on the blockchain.

Algorithmically obtaining the file at a second time may comprise obtaining the file via a file upload interface. Algorithmically obtaining the file at a second time may comprise obtaining the file via an email. Algorithmically obtaining the file at a second time may comprise retrieving the file from storage and making the file available to a second account.

A verification status of "verified" or similar may indicate that a hash of the file obtained at the second time has been matched with the file hash in the entry in the distributed ledger. A verification status of "unverified" or similar may indicate that a hash of the file obtained at the second time has not been matched with the file hash in the entry in the distributed ledger.

Other file, time, and entry in the distributed ledger datasets associated with the portfolio identifier and/or the name identifier may be displayed on the screen. The other datasets associated with the portfolio identifier and/or name identifier may be presented in a subset of the screen. The subset of the screen may be smaller and/or out of focus portions of the screen as compared to portions of the screen displaying information related to the verified file (e.g., the main portion of the screen, etc.). Selecting (e.g., clicking on, pressing a button associated with, engaging with a user interface element associated with, etc.) one of the other datasets may bring that dataset into the main portion of the screen and move the dataset in the main portion of the screen into the subset of the screen. Verification of a file associated with a selected dataset may happen on selection. Verification of a file associated with a selected dataset may happen when the dataset is presented in the subset of the screen. Verification of a file may include portfolio performance gathered from sources external to the distributed ledger.

A portfolio may comprise multiple files. Reconstructing the portfolio may comprise using the multiple files. The multiple files may be linked to each other with identifier information. One or more of the multiple files may be verified when the portfolio is reconstructed.

BRIEF DESCRIPTION OF THE DRAWINGS

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

FIG. 8 illustrates an example GUI in accordance with an exemplary embodiment of the present invention.

FIG. 9 illustrates an example GUI in accordance with an exemplary embodiment of the present invention.

DETAILED DESCRIPTION

Figure 1:
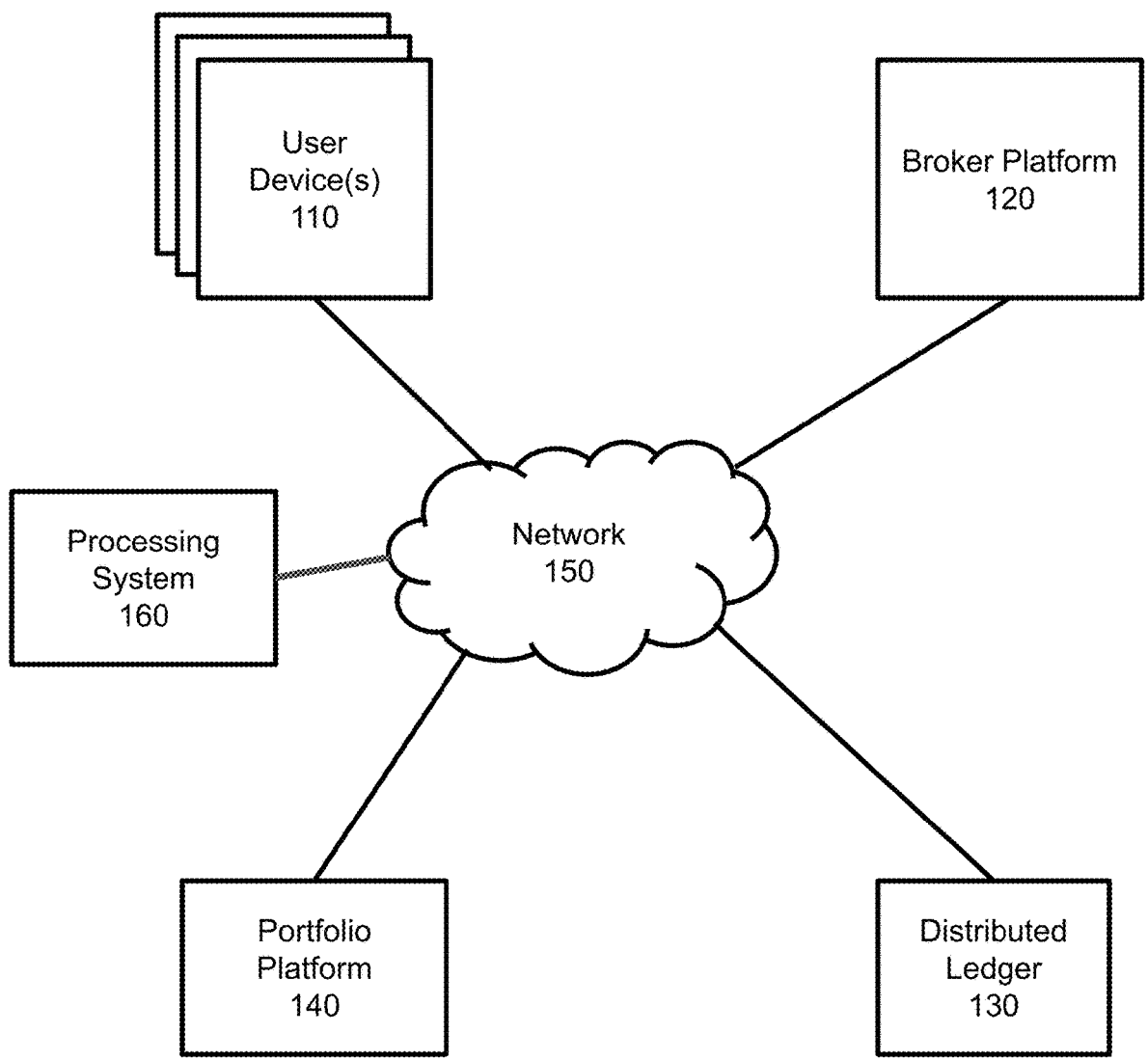
FIG. 1 illustrates a system for verifying asset management performance in accordance with an exemplary embodiment of the invention.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Conceptual Architecture

FIG. 1 illustrates an exemplary embodiment of a system for verifying asset management performance according to one embodiment. The system includes one or more user device(s) 110, a broker platform 120, a distributed ledger 130, a portfolio platform 140, a network 150, and a processing system 160 over which the various systems communicate and interact. The various components described herein are exemplary and for illustration purposes only and any combination or subcombination of the various components may be used as would be apparent to one of ordinary skill in the art. The system may be reorganized or consolidated, as understood by a person of ordinary skill in the art, to perform the same tasks on one or more other servers or computing devices without departing from the scope of the invention.

The one or more user device(s) 110 may comprise an application. The application may be in communication with the portfolio platform 140 via the network 150.

User device(s) 110 include, generally, a computer or computing device including functionality for communicating (e.g., remotely) over a network 150. Data may be collected from user devices 110, and data requests may be initiated from each user device 110. User device(s) 110 may be a server, a desktop computer, a laptop computer, personal digital assistant (PDA), an in- or out-of-car navigation system, a smart phone or other cellular or mobile phone, or mobile gaming device, among other suitable computing devices. User devices 110 may execute one or more applications, such as a web browser (e.g., Microsoft Windows Internet Explorer, Mozilla Firefox, Apple Safari, Google Chrome, and Opera, etc.), or a dedicated application to submit user data, or to make prediction queries over a network 150.

In particular embodiments, each user device 110 may be an electronic device including hardware, software, or embedded logic components or a combination of two or more such components and capable of carrying out the appropriate functions implemented or supported by the user device 110. For example and without limitation, a user device 110 may be a desktop computer system, a notebook computer system, a netbook computer system, a handheld electronic device, or a mobile telephone. The present disclosure contemplates any user device 110. A user device 110 may enable a network user at the user device 110 to access network 150. A user device 110 may enable its user to communicate with other users at other user devices 110.

A user device 110 may have a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user device 110 may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the user device 110 one or more Hyper Text Markup Language (HTML) files responsive to the HTTP request. The user device 110 may render a web page based on the HTML files from server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The user device 110 may also include an application that is loaded onto the user device 110. The application obtains data from the network 150 and displays it to the user within the application interface.

Exemplary user devices are illustrated in some of the subsequent figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing systems may perform at different times or at different locations one or more steps of one or more methods described or illustrated herein, where appropriate.

The broker platform 120 may comprise one or more servers. The broker platform 120 may comprise a cloud computing environment. The broker platform 120 may allow a user to execute one or more asset management strategies (e.g., buy assets, sell assets, set prices for actions, purchase options, sell options, create signals, etc.). The broker platform 120 may comprise portfolio information. The broker platform 120 may allow a user to export a file comprising portfolio information. The broker platform 120 may allow a user to import a file comprising portfolio information. The broker platform 120 may allow a user or third party to apply permissions to access or lock the file.

The distributed ledger 130 may comprise multiple nodes (e.g., validators, etc.) executing similar distributed ledger applications and maintaining a similar distributed ledger 130. The distributed ledger 130 may comprise transactions. The distributed ledger 130 may comprise smart contracts. The distributed ledger 130 may be readable and writable by anyone. The distributed ledger 130 may be readable to the public but only privately writable. The distributed ledger 130 will be described in greater detail in reference to FIG. 2a.

The portfolio platform 140 may comprise one or more servers. The portfolio platform 140 may comprise a cloud computing environment. The portfolio platform 140 may allow users to maintain an account. An account may be associated with a name (e.g., user, user name, entity, account, email address, social media handle, etc.). The portfolio platform 140 may allow users to set up hypothetical accounts and make asset allocation decisions with hypothetical money. The portfolio platform 140 may allow users to set up actual accounts and make live asset allocation decisions. Making live asset allocations may comprise submitting asset allocation decisions to the broker platform 120. Making live asset allocations may comprise executing asset allocation decisions on the portfolio platform 140. The portfolio platform 140 may allow users to set up accounts and make asset allocation decisions with crypto currency. The portfolio platform 140 may obtain portfolio data for an account through the use of the portfolio platform 140 associated with the account. The portfolio platform 140 may allow users to import portfolio data from another platform, such as the broker platform 120. The portfolio platform 140 may allow users to import portfolio data from other protocols known in the art such as Financial Information exchange (FIX).

Network cloud 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 421 or a combination of two or more such networks 150. The present disclosure contemplates any suitable network 150.

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

The processing system 160 is operable to provide a set of commands to allow a user to record an auditable transaction to a third party while maintaining security on the list of transactions. The processing system 160 may comprise an application or computer connected remotely or on the user device 110. The processing system is further explained in FIG. 2c.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to client/user devices or other devices in response to HTTP or other requests from client devices or other devices. A mail server is generally capable of providing electronic mail services to various client devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiments, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Example Distributed Ledger

Figure 2A:
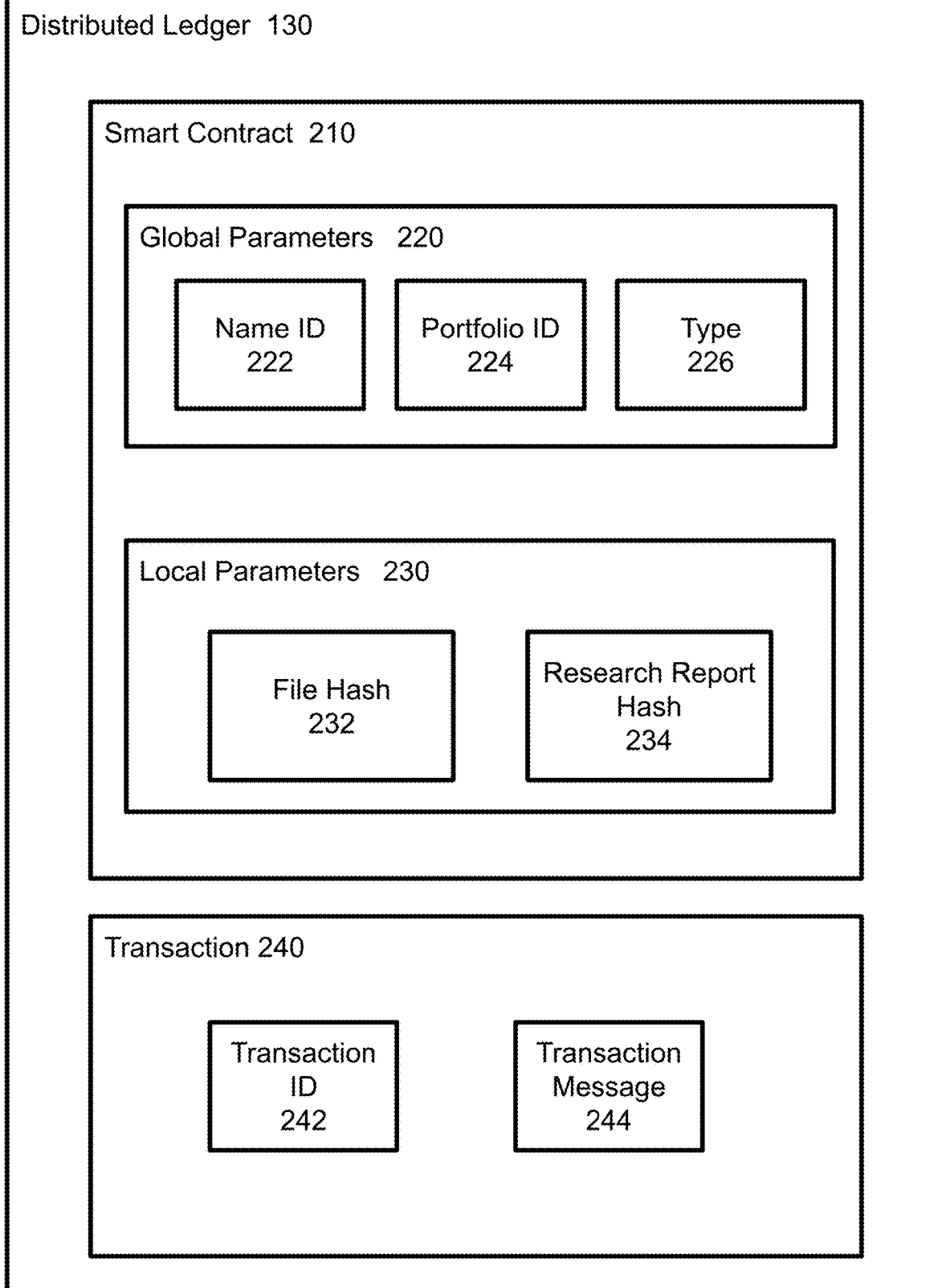
FIG. 2a illustrates an example distributed ledger in accordance with an exemplary embodiment of the present invention.

FIG. 2a illustrates an example distributed ledger 130 in accordance with an exemplary embodiment of the present invention. The distributed ledger 130 may comprise a smart contract 210. The distributed ledger 130 may comprise a transaction 240 (e.g., transaction record, etc.). Although the distributed ledger 130 shown comprises the smart contract 210, it is contemplated that a distributed ledger without smart contract capabilities may also be used to implement the systems and methods described herein. Embodiments contemplate all information stored in a distributed ledger for verification according to the systems and methods disclosed herein to be stored in smart contracts. Embodiments contemplate all information stored in a distributed ledger for verification according to the systems and methods disclosed herein to be stored in transactions. Embodiments contemplate information stored in a distributed ledger for verification according to the systems and methods disclosed herein to be stored in both smart contracts and transactions. Embodiments contemplate information stored in a distributed ledger for verification according to the systems and methods disclosed herein to be stored in either smart contracts or transactions or both.

The smart contract 210 may comprise global parameters 220. The global parameters 220 may be created when the smart contract 210 is created. The global parameters 220 may be immutable. The global parameters 220 may comprise a name identifier (ID) field 222, a portfolio ID field 224, and a type field 226. The global parameters 220 may comprise additional parameters, such as asset class, asset holding time, trading strategy, etc. The name ID field 222 may comprise a name (e.g., user, user name, entity, account, email address, social media handle, etc.) used to identify an account associated with a platform, such as the portfolio platform 140 in FIG. 1. The portfolio ID field 224 may comprise a name of a portfolio associated with a file uploaded to a platform, such as the portfolio platform 140. The type field 226 may comprise a type associated with a file uploaded to a platform, such as the portfolio platform 140. The type may be one of several predetermined labels, such as "holdings", "trades", "signal", "fixed income", "long equity", "long/short equity discretionary", "long/short equity quantitative", "Z-score", "conviction", "strength", "buy/hold/sell", etc. One or more of the name ID field 222, the portfolio ID field 224, and the type field 226 may be encrypted.

The smart contract 210 may comprise local parameters 230. The local parameters 230 may be amended or appended to during a future transaction. The local parameters 230 may comprise a file hash field 232 and a research report hash field 234. The local parameters 230 may comprise additional parameters. The file hash field 232 may comprise a hash of a file comprising portfolio data. The research report hash field 234 may comprise a hash of a research report used to explain (e.g., give reasoning behind, give commentary to, etc.) the file. A file hash may or may not have a corresponding research report hash. Each time a file associated with a portfolio name is updated, one or more new fields may be created (or one or more existing fields may be updated) in the local parameters 230 in the smart contract 210 associated with the portfolio name. The one or more new fields (or updated existing fields) may comprise a file hash of the updated file. The one or more new fields (or updated existing fields) may comprise a research report hash of a research report associated with the updated file. In an aspect, any of the parameters described as being a global parameter 220 may be a local parameter 230 instead. In an aspect, any of the parameters described as being a local parameter 230 may be a global parameter 220 instead.

The transaction 240 may comprise a transaction identifier (ID) field 242 and a transaction message field 244. The transaction ID field 242 may comprise a unique identifier for the transaction 240. The transaction ID 242 may comprise a transaction hash. The transaction message field 244 may comprise a name used to identify an account associated with a platform, a name of a portfolio associated with a file uploaded to a platform, a type associated with a file uploaded to a platform, a file hash, and a research report hash (if any). One or more of the name used to identify the account associated with the platform, the name of the portfolio associated with the file uploaded to the platform, and the type associated with the file uploaded to the platform may be encrypted.

An example distributed ledger, such as distributed ledger 130, may comprise smart contracts, such as smart contract 210, and transactions, such as transaction 240. In such a distributed ledger, a name used to identify an account associated with a platform, a name of a portfolio associated with a file uploaded to a platform, a type associated with a file uploaded to a platform, a file hash, a strategy and a research report hash (if any) may be stored in one or both of a smart contract and a transaction. In an embodiment, the fields of a single file may be stored across multiple smart contracts and/or transactions.

An example distributed ledger may comprise transactions, such as transaction 240, but no smart contracts. In such a distributed ledger, a name used to identify an account associated with a platform, a name of a portfolio associated with a file uploaded to a platform, a type associated with a file uploaded to a platform, a file hash, and a research report hash (if any) may be stored in a transaction. In an embodiment, the fields of a single file may be stored across multiple transactions.

Example Graphical User Interface

Figure 2B:
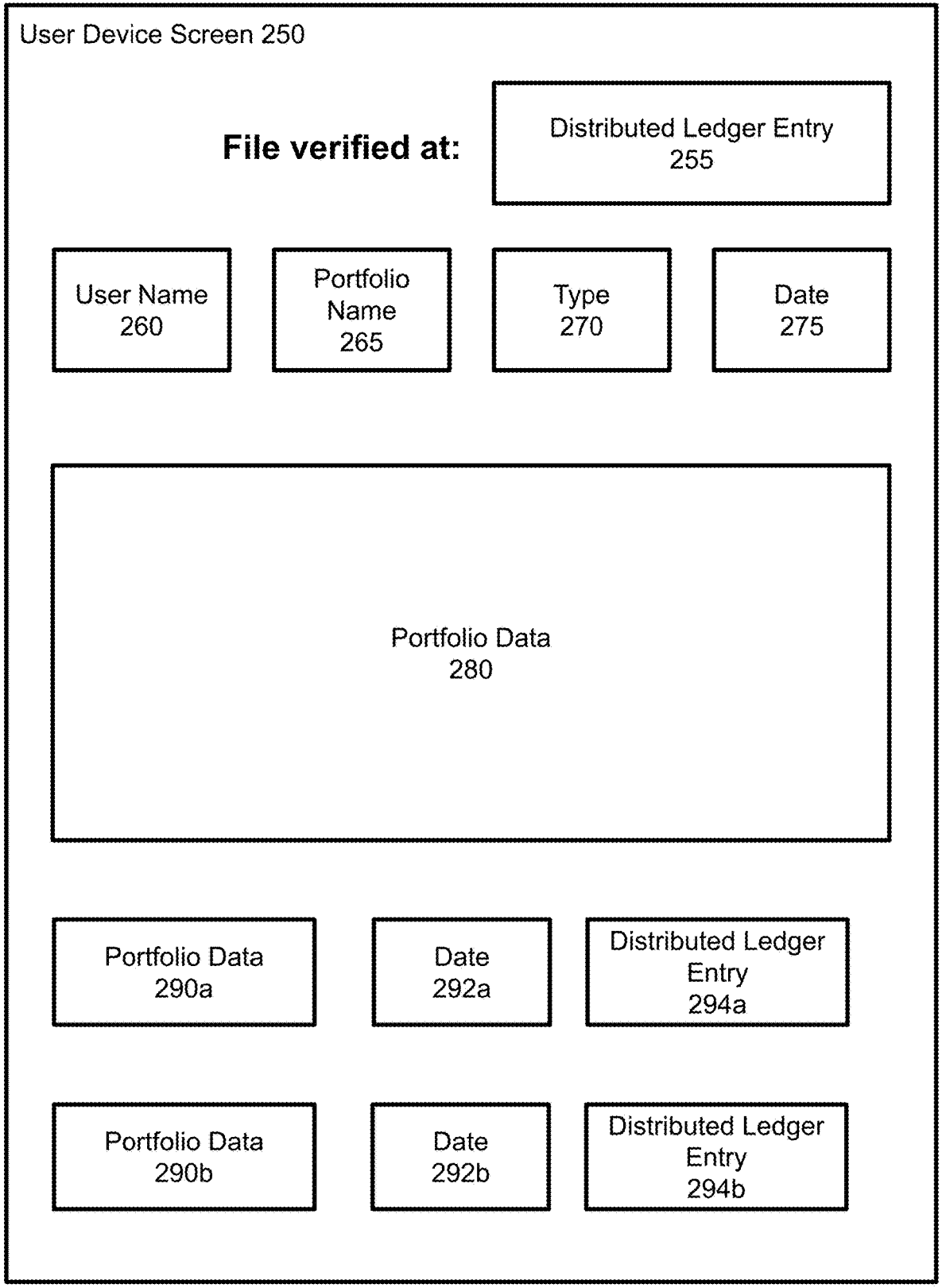
FIG. 2b illustrates an example graphical user interface (GUI) in accordance with an exemplary embodiment of the present invention.

FIG. 2b illustrates an example graphical user interface (GUI) in accordance with an exemplary embodiment of the present invention. The example GUI may appear on a screen 250 of one of the one or more user device(s) 110 in FIG. 1. The screen 250 may comprise a verified field that indicates a verification status. The field that indicates verification status may comprise a Boolean value. The field that indicates verification status may be hidden. The screen 250 may comprise a verification status associated with one or more files and a distributed ledger entry field 255 for showing information associated with one or more distributed ledger entries associated with the one or more files. The screen 250 may comprise a user name field 260 for showing a name associated with the one or more files. The screen 250 may comprise a portfolio name field 265 for showing a portfolio name associated with the one or more files. The screen 250 may comprise a type field 270 for showing a type associated with the one or more files. The name, portfolio name, and/or type may be obtained contemporaneously with obtaining the one or more files. In an aspect, where the global parameters are encrypted, the name, portfolio name, and/or type may be obtained by decrypting global parameters associated with the one or more distributed ledger entries associated with the one or more files. The screen 250 may comprise a date field 275 for showing one or more timestamps and dates. The one or more timestamps and dates may be one or more timestamps and dates that one or more hashes associated with one or more files were recorded on the distributed ledger and/or in one or more smart contracts associated with the distributed ledger. The one or more timestamps and dates may be preserved using one or more timestamps associated with the distributed ledger. The one or more timestamps associated with the distributed ledger may comprise one or more trusted timestamps.

The screen 250 may comprise a portfolio data section 280 which displays portfolio data associated with the one or more files. The portfolio data section 280 may display the contents of the one or more files. The portfolio data section 280 may show assets held, trades, signals, target quantities, current quantities, trade quantities, z-scores, signals with decay, z-scores with decay, recommendations, assets, instruments, priorities, etc. The distributed ledger entry field 255, the user name field 260, the portfolio name field 265, the type field 270, and the date field 275 and the portfolio data 280 may make up the main fields and section.

Optionally, the screen 250 may comprise a subsection comprising file data associated with related files. Related files may be files with the same name and/or portfolio name. The subsection may organize the related files in sets of files, dates, and distributed ledger entries. The subsection may display a files portfolio data, date, and distributed ledger entry information, such as the subsection in screen 250 shows portfolio data 290a, date 292a, and distributed ledger entry 294a associated with a first related file and portfolio data 290b, date 292b, and distributed ledger entry 294b associated with a second related file. Engagement with an element associated with the first related file may move information associated with the first related file into the main fields 255, 260, 265, 270, and 275 and section 280 and portfolio data, date information, and distributed ledger entry information related to the file currently shown in the main fields 255, 260, 265, 270, and 275 and section 280 into the subsection.

Processing System for Verifying Asset Management Performance

Figure 2C:
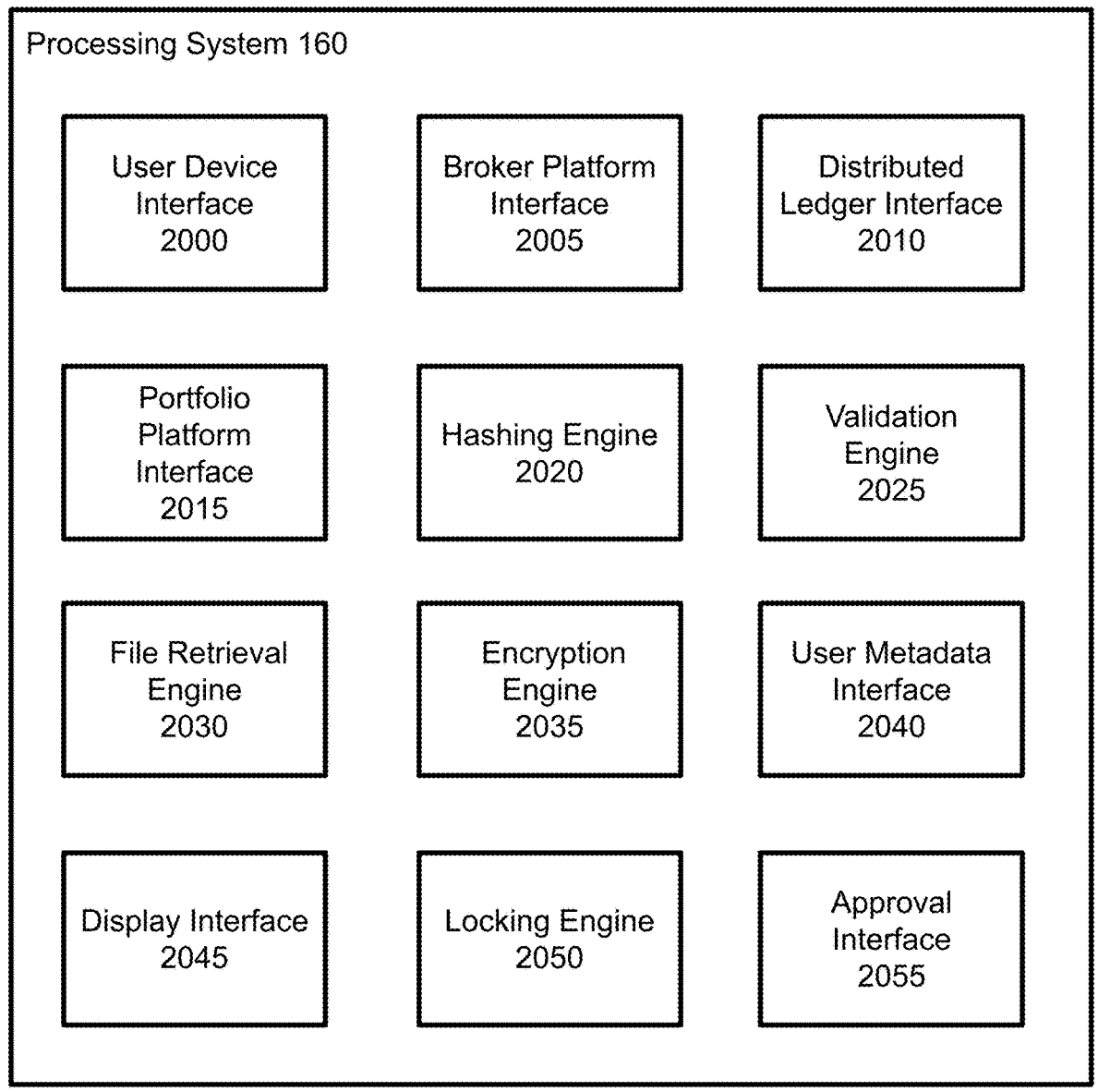
FIG. 2c illustrates an example processing system in accordance with an exemplary embodiment of the present invention.

FIG. 2c illustrates an exemplary processing system 160 for verifying asset management performance. The processing system 160 comprises user device interface 2000, broker platform interface 2005, distributed ledger interface 2010, portfolio platform interface 2015, hashing engine 2020, validation engine 2025, file retrieval engine 2030, encryption engine 2035, location interface 2040, display interface 2045, locking engine 2050, and approval interface 2055.

The user device interface 2000 is operable to obtain user assets and identifying data for storage on the distributed ledger 130 and portfolio platform 140 by receiving user input from the user device(s) 110. The data obtained from the user device interface 2000 may comprise user metadata and user encryption data. The user metadata may comprise at least one of geolocation, name, ip address, and encrypted proprietary information. The user device interface 2000 may utilize data transmission techniques known in the art.

The broker platform interface 2005 is operable to obtain at least one of user portfolio information and asset value data. The user portfolio information may comprise data found in FIGS. 2a and 2b. The asset value data may comprise value of stocks or asset holdings at various times related to portfolio information. The broker platform interface 2005 may comprise at least one of data scraping techniques known in the art and application programming interfaces, APIs.

The distributed ledger interface 2010 is operable to send and receive data between the various devices connected to the network 150 and the distributed ledger 130. The data shared over the distributed ledger interface 2010 may comprise hashed and unaltered data related to the user information and the portfolios related to that user. The distributed ledger interface 2010 may utilize data transmission techniques known in the art.

The portfolio platform interface 2015 is operable to receive and store user portfolios for access later by a third party. The portfolio platform interface 2015 may comprise an API capable of exchanging information over the network 150. The portfolio platform interface 2015 may comprise data that comprises holdings within a portfolio and evaluates or displays the performance of the portfolio. The data to evaluate the performance of the portfolio may comprise at least one of absolute return (total and annualized), risk-adjusted return (Sharpe, Sortino, Treynor ratios), volatility (standard deviation, beta, VaR), benchmark comparison (alpha, tracking error), diversification (R-squared, information ratio), drawdown metrics (maximum drawdown, recovery time), income measures (dividend yield, growth rate), expense ratios (management fees, transaction costs), and other measures known in the art.

The hashing engine 2020 is operable to apply a hashing algorithm to the user uploaded data to produce a file hash. The hashing engine 2020 may comprise at least one of MD5 (Message Digest Algorithm 5), SHA-1 (Secure Hash Algorithm 1) SHA-2 family, SHA-3 family, CRC32 (Cyclic Redundancy Check), and Argon2, or hashing algorithms known in the art.

The validation engine 2025 is operable to provide validation that a user provided portfolio to a third party can be proven as created by the user at a predefined time. The validation engine 2025 may comprise a set of commands to confirm that a user provided hash matches the hash found on the distributed ledger 130. The validation engine 2025 may utilize data from the location interface 2040 and the distributed ledger interface 2010. Validation is further explained in FIG. 3b.

The file retrieval engine 2030 is operable to provide the original user data to a third party when the file has been validated. The file retrieval engine 2030 may interface with at least one of a user device interface 2000, broker platform interface 2005, distributed ledger interface 2010, portfolio platform interface 2015, and display interface 2045. The file retrieval engine may be disabled through the locking engine 2050.

The encryption engine 2035 is operable to encrypt and decrypt user data uploaded to the processing system 160. The encryption engine 2035 may obtain permission from at least one of the users or a database management system before decryption. The encryption engine 2035 may utilize AES (Advanced Encryption Standard), RSA (Rivest-Shamir-Adleman), TLS (Transport Layer Security), SSL (Secure Sockets Layer), ECC (Elliptic Curve Cryptography), and other known encryption techniques in the art.

The location interface 2040 is operable to obtain a user location metadata. The location interface may comprise global positioning system, GPS, data or other location data known to those in the art.

The display interface 2045 may comprise a connection between the processing system 160 and a display device. The display interface 2045 may comprise connections operable to send commands to display on monitors or other display devices known in the art. The displays may comprise monitors or mobile computing screens. The display interface 2045 may send data to a screen not associated with the user device 110 with permissions from the user.

The locking engine 2050 is operable to lock and unlock the user data uploaded to the distributed ledger 130. The locking engine may be operable through the user device(s) 110 and may be unlocked or locked manually or automatically based on commands given through the processing system 160. The automatic locking command may be given when the user data is sold to another user to prevent further sales.

The approval interface 2055 may be used to provide access to the user data from at least one user through the use of at least one user device 110. The approval interface may provide approval automatically or manually and may require the manager of the distributed ledger 130 to provide access or sales of user data to a third party.

Processes for Verifying Asset Management Performance

Figure 3A:
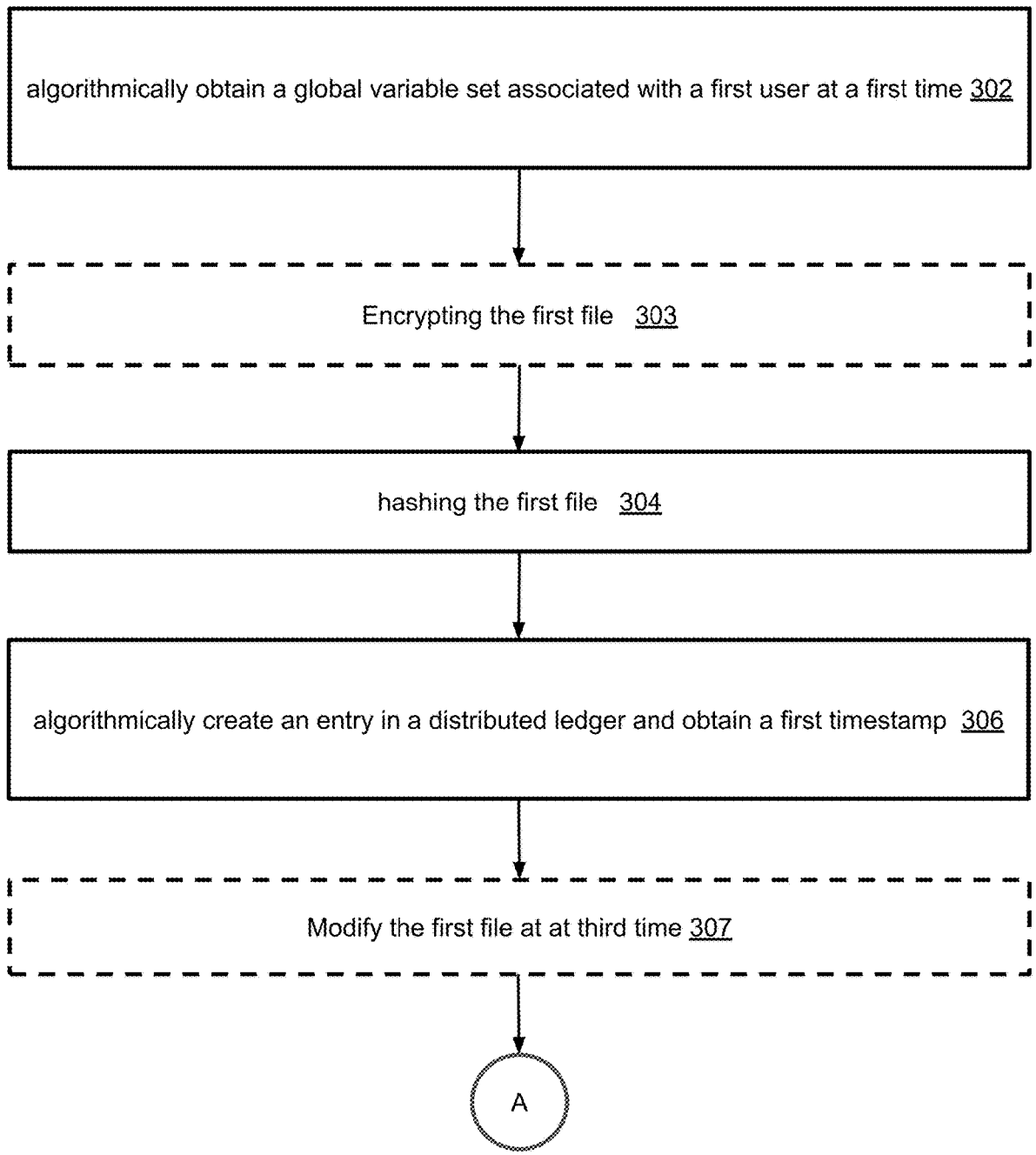
FIGS. 3a-3b illustrate an exemplary process for verifying asset management performance according to one embodiment of the invention.
Figure 3B:
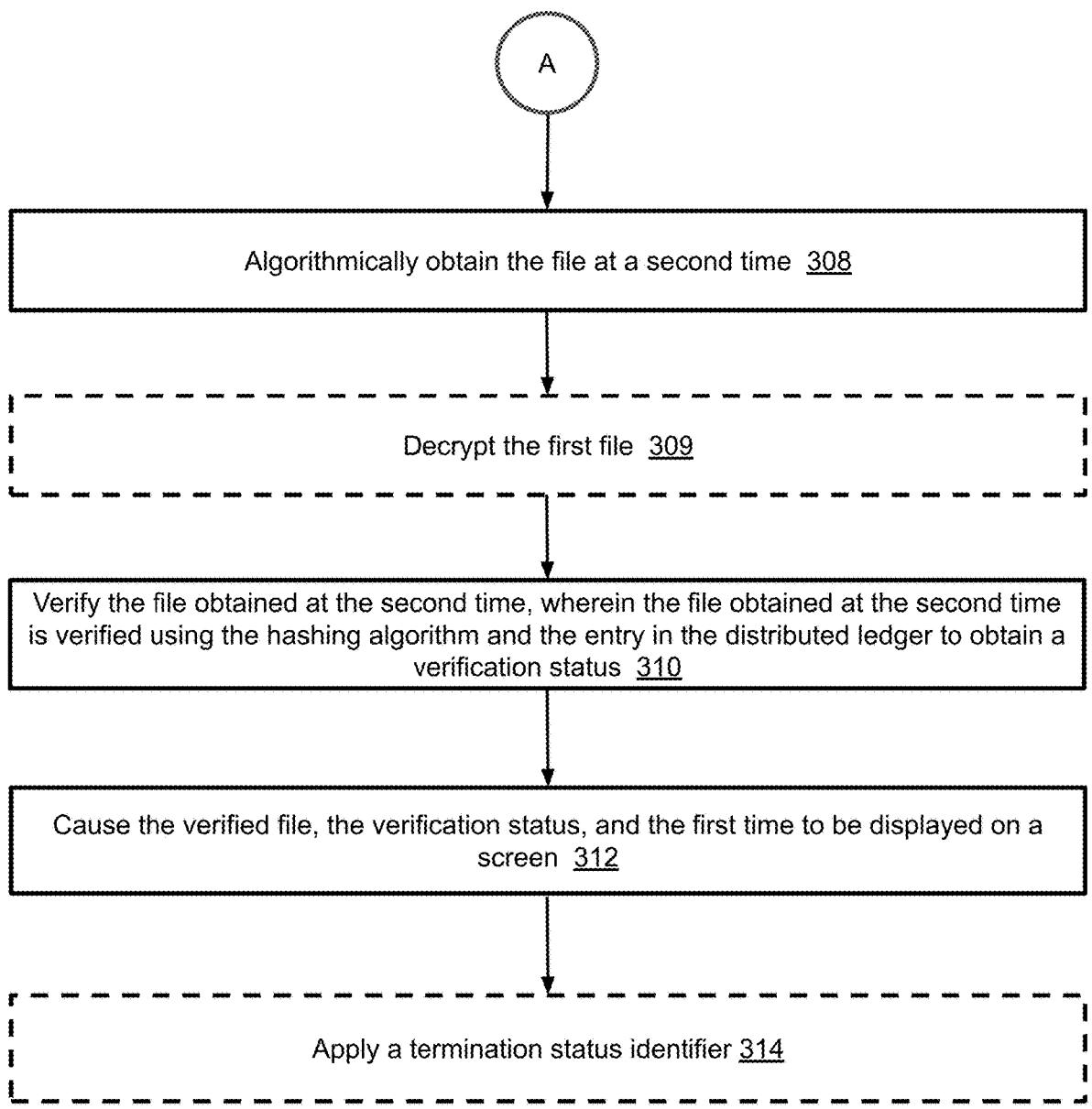

FIGS. 3a-3b illustrate an exemplary process for verifying asset management performance according to one embodiment of the invention. The process comprises steps 302-314. The process steps described herein may be performed in association with a system such as that described in FIG. 1 and/or FIGS. 2a-2b above or in association with a different system. The process may comprise additional steps, fewer steps, and/or a different order of steps without departing from the scope of the invention as would be apparent to one of ordinary skill in the art.

At step 302, at least one of a name identifier, portfolio identifier, type, and file may be algorithmically obtained. For example, the portfolio platform 140 in FIG. 1 may algorithmically obtain a name identifier, portfolio identifier, type, and file. The file may comprise portfolio information. The type may indicate a type associated with the file. The type may comprise "assets" or a similar title and the file may comprise portfolio holdings. The type may comprise "trades" or a similar title and the file may comprise asset buys, sells, etc., and associated dates and amounts. The type may comprise "signal" or a similar title and the file may comprise signals, such as quantitative signals, buy and/or sell signals, and/or signal information, such as a z-score, a p-value, conviction, etc. The type may comprise "orders" and the file may comprise information regarding orders and how the orders are traded. The name identifier may be a unique identifier associated with an account. The account may be associated with a user name, entity name, email address, social media account, etc. A name may be associated with the account. The portfolio identifier may be a unique identifier associated with the file. The account may comprise multiple files. A name identifier may be associated with multiple portfolio identifiers. Algorithmically obtaining at least one of a name identifier, portfolio identifier, type, and file may comprise obtaining one or more of the name identifier, portfolio identifier, type, and file via a file upload interface. Algorithmically obtaining at least one of a name identifier, portfolio identifier, type, and file may comprise obtaining one or more of the name identifier, portfolio identifier, type, and file via a form. Algorithmically obtaining at least one of a name identifier, portfolio identifier, type, and file may comprise obtaining one or more of the name identifier, portfolio identifier, type, and file via a received email.

The type may comprise "target quantity" or a similar title and the file may comprise an "asset" or a similar column, an "instrument" or a similar column, a "target quantity" or a similar column, a "priority" or a similar column, etc. The type may comprise "current and trade quantity" or a similar title and the file may comprise an "asset" or a similar column, an "instrument" or a similar column, a "current quantity" or a similar column, a "trade quantity" or a similar column, a "priority" or a similar column, etc. The type may comprise "z-score", "signal", or a similar title and the file may comprise an "asset" or a similar column, an "instrument" or a similar column, a "signal" or a similar column, a "decay" or a similar column, a "priority" or a similar column, etc. The type may comprise "z-score with decay", "signal with decay", or a similar title and the file may comprise an "asset" or a similar column, an "instrument" or a similar column, a "signal" or a similar column, a "decay" or a similar column, a "priority" or a similar column, etc. The type may comprise "recommendation" or a similar title and the file may comprise an "asset" or a similar column, an "instrument" or a similar column, a "recommendation" or a similar column, a "priority" or a similar column, etc. Although specific type and column combinations are mentioned, any type and associated column combinations may be used. For example, any file type with associated columns that are common practice in trading may be used. Examples of file types that are common practice in trading may comprise types described above, types comprising market orders, types comprising limit orders, types comprising stop orders, types comprising stop-limit orders, types comprising trailing stop orders, etc. Examples of columns in file types that are common practice in trading may comprise columns described above, "good for today" or a similar column, "good-til-canceled" or a similar column, "immediate-or-cancel" or a similar column, "fill-or-kill" or a similar column, "all-or-none" or a similar column, "on open" or a similar column, "on close" or a similar column, etc. Financial Information exchange (FIX) may also be utilized to fill the columns or other protocols known in the art.

Optionally, at step 303, at least one of the name identifier, portfolio identifier, and type may be encrypted. For example, the portfolio platform 140 may encrypt the name identifier, portfolio identifier, and type. This encryption may be done by at least one of the creator of the data and the manager of the distributed ledger. The encryption may be done before or after hashing the file.

At step 304, the file may be hashed using a hashing algorithm to obtain a file hash. For example, the portfolio platform 140 may hash the file using a hashing algorithm to obtain a file hash. As another example, the user device 110 may hash the file using a hashing algorithm and transmit the file hash to the portfolio platform 140. A research report may be associated with the file. The research report may be hashed using the hashing algorithm to obtain a research report hash.

At step 306, an entry in a distributed ledger comprising at least one of the name identifier, the portfolio identifier, the type, and the file hash may be algorithmically created at a first time. For example, the portfolio platform 140 may algorithmically create an entry in a distributed ledger comprising the name identifier, the portfolio identifier, the type, and the file hash at a first time. The entry in the distributed ledger may comprise the research report hash. One or more of the name identifier, the portfolio identifier, and the type may be encrypted. The file may additionally be optionally be stored on a portfolio database. This file may be stored on the portfolio database, unviewable, until the first user grants permission to allow access to a second user.

Algorithmically creating an entry in a distributed ledger may comprise creating a smart contract in the distributed ledger. The smart contract may comprise global parameters, which may not be changed by a user, and local parameters, which may be changed by a user. The global parameters may be changed by a smart contract owner (e.g., an entity controlling the portfolio platform 140, etc.). The global parameters may comprise the name identifier, the portfolio identifier, and the type. The local parameters may comprise the file hash. The local parameters may comprise the research report hash. Initially, data associated with a particular portfolio identifier are used to create an entry in a distributed ledger, a smart contract may be created and the global parameters may be set, along with the particular local parameters (e.g., file hash, research report hash, etc.) for the particular time. Subsequent times data associated with a particular portfolio identifier are used to create an entry in a distributed ledger, local parameters may be updated and/or added to the smart contract, wherein the local parameters may comprise a new file hash, a new research report hash, etc. associated with a new time.

Algorithmically creating an entry in a distributed ledger may comprise creating a transaction in the distributed ledger. The transaction may comprise transaction identifier and a transaction message. The transaction message may comprise the name identifier, the portfolio identifier, the type. The transaction message may comprise the file hash. The transaction message may comprise the research report hash. One or more of the name identifier, the portfolio identifier, and the type may be encrypted.

The first time may be recorded using a timestamp. The timestamp may be a trusted timestamp. The timestamp may be produced by the distributed ledger.

Optionally at step 307, the entry in the distributed ledger may be updated or modified by a user. This modification may contain any of the information types and contents found in step 302. Additionally, this modification may contain identifying information that links the modified file back to the initial file. This modification may then be recorded in the distributed ledger. The information linking back to the earlier entry may be stored as at least one of a local variable and variable in the smart contract or transaction. This linking may prove the first and third time are linked one to one. This linking may include at least one of the first file hash, user metadata, transaction id, a local variable, and other known data that may link the two entries. The entry may be recorded using a timestamp. the timestamp may be produced by the distributed ledger.

At step 308, the file may be algorithmically obtained at a second time. For example, the portfolio platform 140 may algorithmically obtain the file at a second time. Algorithmically obtaining the file at a second time may comprise obtaining the file via a file upload interface. Algorithmically obtaining the file at a second time may comprise obtaining the file via an email. Algorithmically obtaining the file at a second time may comprise retrieving the file from storage and making the file available to a second account.

Optionally at step 309 the file may be decrypted. The decryption may require a password or other known methods of ownership attribution to decrypt the data. The decryption of the data may require at least one of the passwords from either the creator of the data or the manager of the distributed ledger to decrypt the data.

At step 310, the file obtained at the second time may be verified. For example, the portfolio platform 140 may verify the file obtained at the second time. The file obtained at the second time may be verified using the hashing algorithm and the entry in the distributed ledger to obtain a verification status. A verification status of "verified" or similar may indicate that a hash of the file obtained at the second time has been matched with the file hash in the entry in the distributed ledger. A verification status of "unverified" or similar may indicate that a hash of the file obtained at the second time has not been matched with the file hash in the entry in the distributed ledger.

At step 312, the verified file, the verification status, and the first time may be caused to be displayed on a screen. For example, the portfolio platform 140 may cause the verified file, the verification status, and the first time to be displayed on a screen of one of the one or more user device(s) 110 in FIG. 1. Other file, time, and entry in the distributed ledger datasets associated with the portfolio identifier and/or the name identifier may be displayed on the screen. The other datasets associated with the portfolio identifier and/or name identifier may be presented in a subset of the screen. The subset of the screen may be smaller and/or out of focus portions of the screen as compared to portions of the screen displaying information related to the verified file (e.g., the main portion of the screen, etc.). Selecting (e.g., clicking on, pressing a button associated with, engaging with a user interface element associated with, etc.) one of the other datasets may bring that dataset into the main portion of the screen and move the dataset in the main portion of the screen into the subset of the screen. Verification of a file associated with a selected dataset may happen on selection. Verification of a file associated with a selected dataset may happen when the dataset is presented in the subset of the screen. Step 312 may comprise displaying a file count data. The file count data may represent the number of files on the distributed ledger associated with the user of the verified file.

Optionally, a portfolio associated with the portfolio identifier may comprise multiple files, including the file. In such a scenario, each of the multiple files may be verified as described above. The multiple files may be used to reconstruct the portfolio. The portfolio may be evaluated for performance.

Optionally at step 314, the file may be locked, preventing further access by the user or third parties. This may be done automatically or require permission from the user or other third party. This locking may be done in response to the file being sold to a third party or other reasons known to those in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments). Any of the above mentioned systems, units, modules, engines, controllers, components or the like may be and/or comprise hardware and/or software as described herein. For example, the one or more user device(s) 110 in FIG. 1, the broker platform 120 in FIG. 1, the distributed ledger 130 in FIG. 1, the portfolio platform 140 in FIG. 1, and subcomponents thereof may be and/or comprise computing hardware and/or software as described herein in association with FIGS. 4-7. Furthermore, any of the above mentioned systems, units, modules, engines, controllers, components, interfaces or the like may use and/or comprise an application programming interface (API) for communicating with other systems units, modules, engines, controllers, components, interfaces or the like for obtaining and/or providing data or information.

Figure 4:
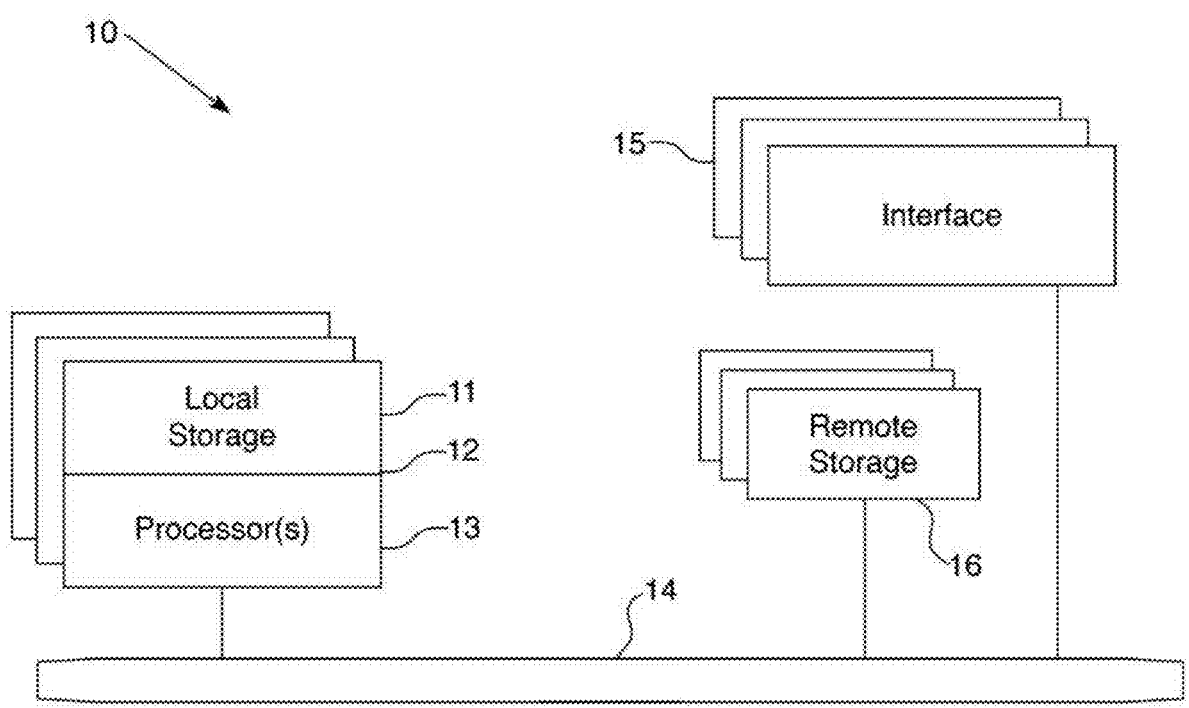
FIG. 4 illustrates one embodiment of the computing architecture that supports an embodiment of the inventive disclosure.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 4 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
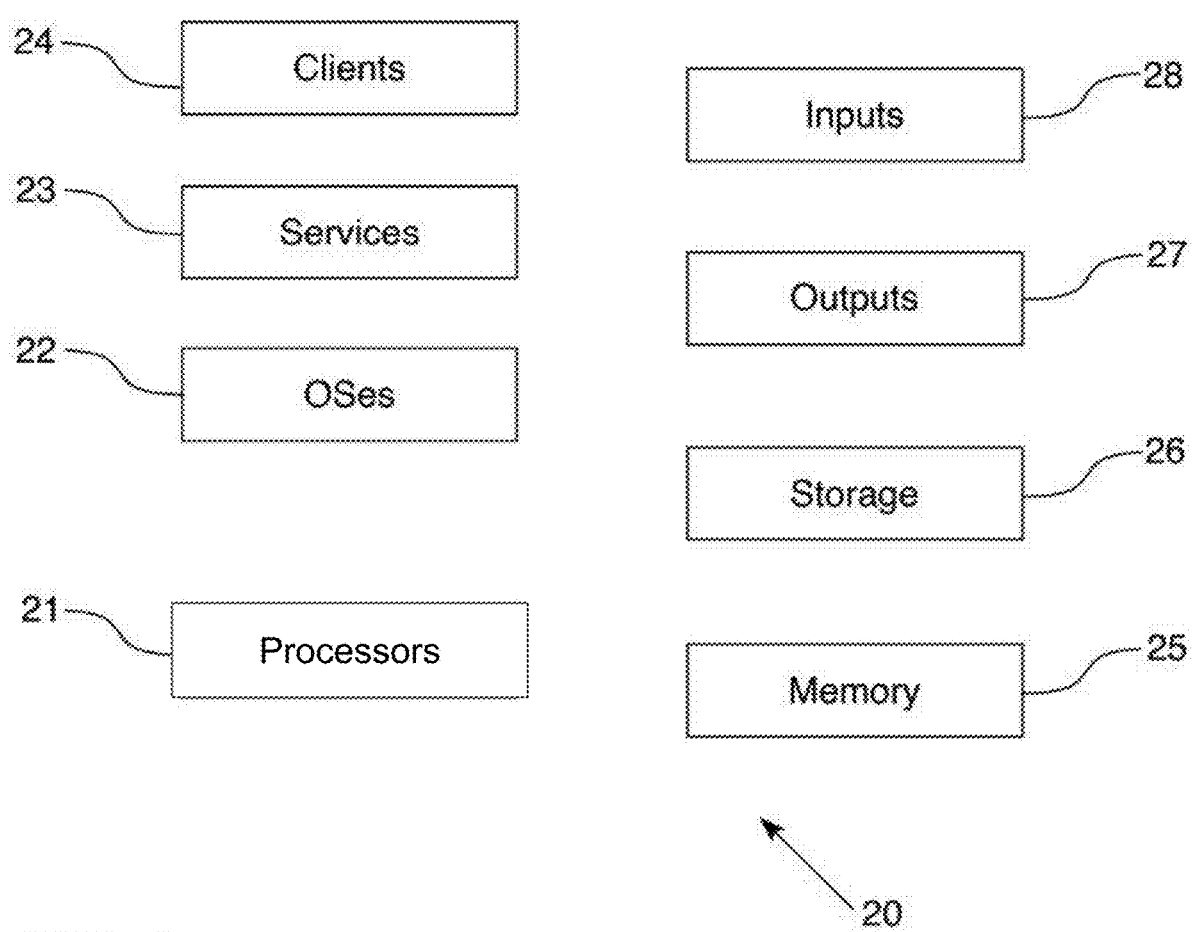
FIG. 5 illustrates components of a system architecture that supports an embodiment of the inventive disclosure.

In some embodiments, systems may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments, such as for example a client application. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 4). Examples of storage devices 26 include flash memory, magnetic hard drive, CD-ROM, and/or the like.

Figure 6:
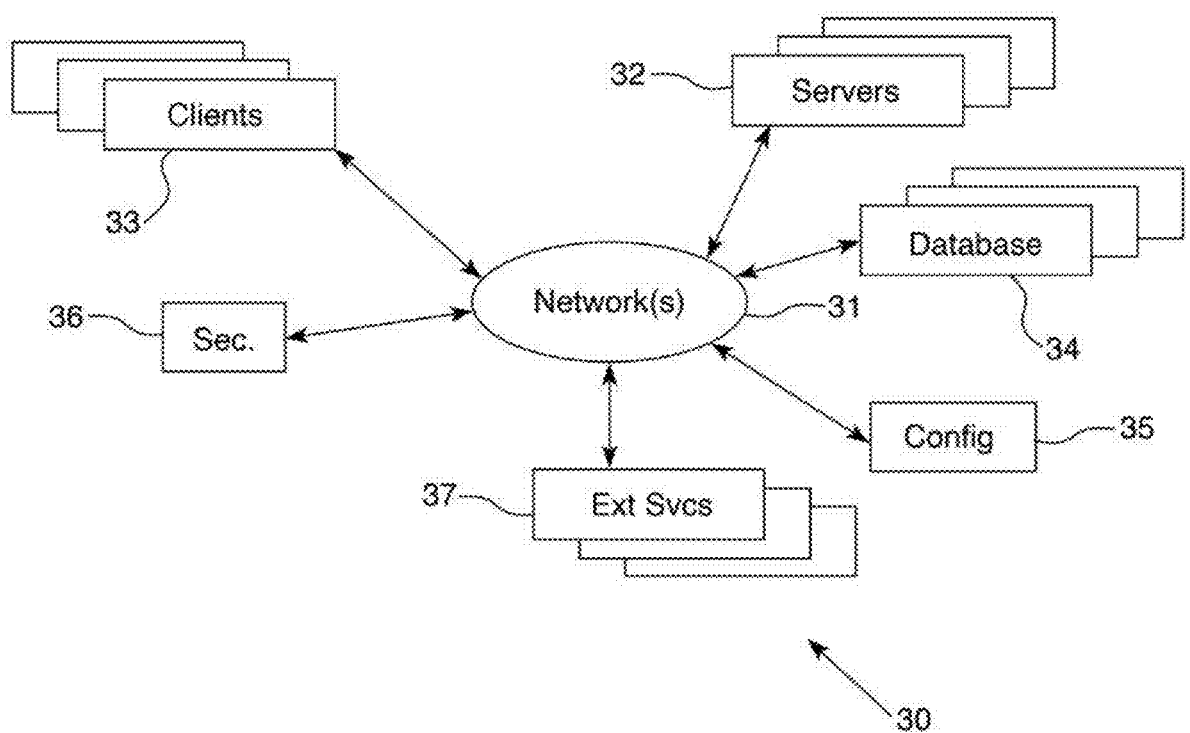
FIG. 6 illustrates components of a computing device that supports an embodiment of the inventive disclosure.

In some embodiments, systems may be implemented on a distributed computing network, such as one having any number of clients and/or servers. Referring now to FIG. 6, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications are implemented on a smartphone or other electronic device, client applications may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 7:
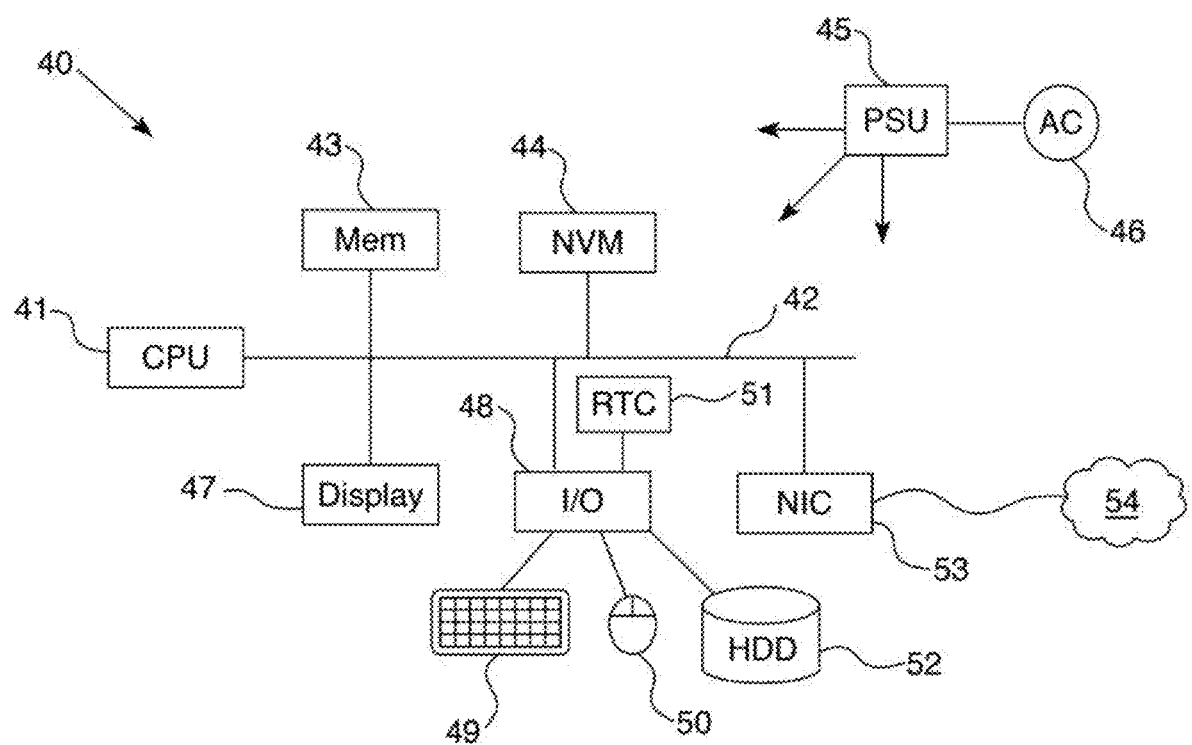
FIG. 7 illustrates components of a computing device that supports an embodiment of the inventive disclosure.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

Example Graphical User Interfaces

Figure 8:
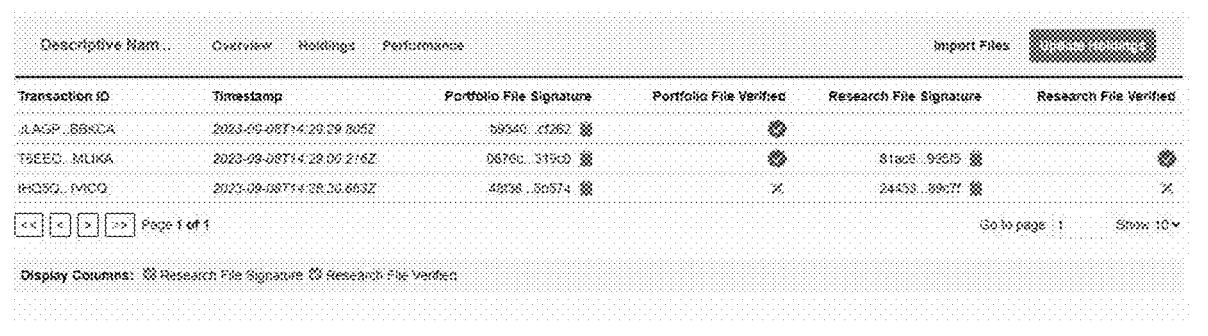
Figure 9:
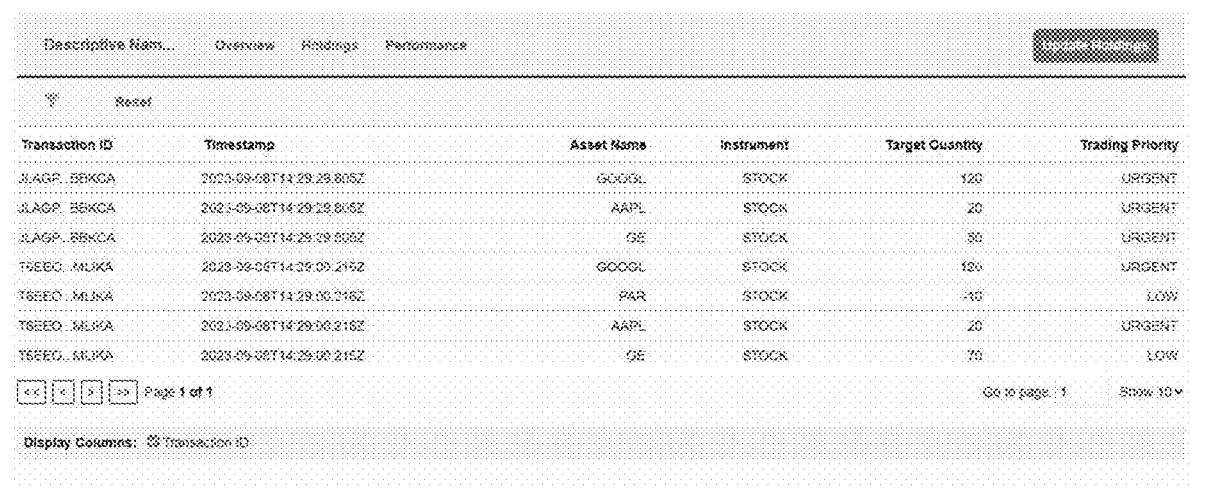

FIGS. 8-9 show example graphical user interfaces (GUIs). Although GUIs are shown, accessing the methods and systems disclosed herein via GUI is only one embodiment. The methods and systems disclosed herein may be accessed via an application programming interface (API). The methods and systems disclosed herein may be accessed via a plug-in to an existing program, such as Microsoft Excel, Google Sheets, etc. As described herein, a GUI may be a screen, webpage within a web domain, etc.

A first GUI may comprise an element (e.g., button, etc.) to receive an indication to create a new portfolio. In response to engagement (e.g., pressing, etc.) of the element, a second GUI may receive portfolio characteristics. Portfolio characteristics may comprise a portfolio name, a region, a market, a strategy, an instrument, a holding period, a number of instruments, a summary, etc. Portfolio characteristics may be open-ended. For example, a user may type in a portfolio name and/or summary. Portfolio characteristics may be selected from a list of possibilities. For example, in one embodiment, a user may select a region from a list of recognized regions, a market from a list of recognized markets, etc. The second GUI may comprise an element, wherein engagement of the element creates a new portfolio with the received portfolio characteristics and returns to the first GUI. When the new portfolio is created, a smart contract with global variables associated with one or more portfolio characteristics may be created.

The first GUI may show the created portfolio as a viewable element (portfolio element). The portfolio element may comprise engageable element, such as an update element, a view element, etc. Engagement of the update element may cause a pop-up to appear on the first GUI. Although described as a pop-up, information shown and received on the pop-up could be shown and received on a new GUI. The pop-up may comprise a signature element and a file element. One of the signature element and the file element may be selected at a time. If the signature element is selected, then the pop-up may accept file hashes associated with a portfolio file, research report, etc. If the file element is selected, then the pop-up may accept files associated with a portfolio file, research report, etc. and cause the accepted files to be hashed. The pop-up may accept a summary. When signatures or files are added, local variables associated with the smart contract associated with the portfolio may be updated or added with the file hashes and/or summary. When signatures or files are added, a transaction may be added to a distributed ledger with the file hashes and/or summary and at least one portfolio characteristic.

Engagement of the view element on the portfolio element may cause a third GUI to appear. The third GUI may look similar to FIG. 8. As shown, the third GUI may comprise an overview element, a holdings element, and a performance element, wherein only one of the overview element, the holdings element, and the performance element may be selected at a time. The third GUI may comprise an upload files element to upload portfolio files and/or research reports, wherein engagement of the upload files element allows for the uploading of portfolio files and/or research reports, which are then hashed to receive a corresponding signature. In the third GUI, the overview element may be selected. The third GUI may comprise an update holdings element, wherein engagement of the update holdings element causes a pop-up and/or GUI as described in the previous paragraph to be displayed. The third GUI may comprise a table. The table may comprise an entry for each time a file hash associated with the portfolio was stored on a distributed ledger. The table may comprise a transaction identifier (id) column, which may comprise a transaction id associated with an entry in the table. The transaction id may identify the transaction in the distributed ledger. The table may comprise a timestamp column. Data in the timestamp column may be pulled from the distributed ledger for each entry. The table may comprise a portfolio file signature column. Data in the portfolio file signature column may comprise file hashes pulled from the distributed ledger for each entry. The table may comprise a portfolio file verified column, which indicates whether a file hash in the portfolio file signature column matches a file hash derived from an uploaded portfolio file for each entry. In indication of verification may comprise a color, such as green, a symbol, such as a checkmark, etc. In indication of no verification may comprise a color, such as red, a symbol, such as an X, etc. The table may comprise a research file signature column. Data in the research file signature column may comprise research report hashes pulled from the distributed ledger for each entry. The table may comprise a research file verified column, which indicates whether a research report hash in the research file signature column matches an uploaded research report hash for each entry. In indication of verification may comprise a color, such as green, a symbol, such as a checkmark, etc. In indication of no verification may comprise a color, such as red, a symbol, such as an X, etc.

Selection of the holdings element may cause a fourth GUI to be displayed. The fourth GUI may look similar to FIG. 9. The fourth GUI may comprise the overview element, the holdings element, the performance element, and the update holdings element described in reference to the third GUI. The fourth GUI may comprise a table. The table may comprise an entry for each position in all of the portfolio files. The table may comprise a transaction identifier (id) column, which may comprise a transaction id associated with a transaction in a distributed ledger which comprises a hash of a corresponding portfolio file for each entry. The table may comprise a timestamp column, which may comprise a timestamp associated with the transaction id for each entry. The remaining columns may depend on the type of files being verified. The type of files being verified may be the same as the types of files that a user previously submitted for verification. The columns may track the columns described in paragraph 59. For example, if the files being verified are target quality files, then there may be an asset name column, an instrument column, a target quality column, and a trading priority column. In an embodiment, the table may only show entries from files that were verified.

Selection of the performance element may show information related to performance of the portfolio. Information related to performance of the portfolio may comprise graphical information. Information related to performance of the portfolio may comprise expected performance information. Information related to performance of the portfolio may comprise historical performance information. Information related to performance of the portfolio may comprise baseline performance information.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and/or a process associated with the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer implemented method for comparing files to determine file authenticity and maintain investment strategy confidentiality, the computer implemented method comprising:

algorithmically obtain a global variable set associated with a first user at a first time, the global variable set comprising name identifier, portfolio identifier, type, and global user metadata, and first file, wherein the first file comprises at least one of local user metadata and portfolio information, wherein the portfolio information comprises at least one of a set of holdings, orders and/or user notes;

hashing the first file using a hashing algorithm to obtain a first file hash;

algorithmically create a first file entry in a distributed ledger comprising the global variable set and the first file hash at a first time, wherein the creation of the first file entry in the distributed ledger creates a first timestamp associated with the first file entry and a first file transaction ID;

modifying the first file at a second time with a modified dataset, the modified dataset comprising secondary portfolio information different from the information stored in the first file entry to create a modified file;

hashing the modified file using the same hashing algorithm applied to the first file to obtain a modified file hash;

algorithmically create a second file entry in the distributed ledger at a third time, the second file entry comprising the global variable set, the modified file hash, and the first file transaction ID, wherein the creation of the second file entry in the distributed ledger creates a second timestamp associated with the second file entry;

algorithmically obtain a second file at a fourth time, the second file comprising a copy of the modified file;

verify the second file obtained at the fourth time matches the second file entry, wherein the second file obtained at the fourth time is verified by hashing the second file using the same hashing algorithm applied to the first file to obtain a second file hash and searching for the second file hash in the distributed ledger to obtain a verification status in real time;

wherein the verification status provides an indication of authenticity of the second file when the second file hash is determined to be present in the distributed ledger while allowing a user to maintain confidentiality of the first file and modified dataset from the first time until the fourth time;

obtain asset performance data associated with the portfolio information in the first file and modified dataset from a portfolio database;

generate a portfolio performance data set from the asset performance data and the second file; and cause the second file, the verification status, the portfolio performance data set, and the first and second timestamps to be displayed on a screen.

2. The computer implemented method according to claim 1, wherein the first file transaction ID comprises at least one of the first file hash, user metadata, transaction id, and a local variable.

3. The computer implemented method according to claim 1, comprising encrypting the global variable set and modified file with a passcode provided by the first user, wherein the encrypting is done before or after hashing the first file.

4. The computer implemented method according to claim 1, wherein the local and global user metadata may comprise at least one of geolocation, name, ip address, and encrypted proprietary information.

5. The computer implemented method according to claim 4, wherein verifying the second file further comprises comparing at least one of global and local user metadata associated with the first file to the first user's metadata obtained through at least one of sensors and user input.

6. The computer implemented method according to claim 1, further comprising encrypting the global variable set and first file with a passcode provided by a third user, wherein the encrypting is done before or after hashing the first file.

7. The computer implemented method according to claim 1, further comprising encrypting the global variable set and first file with a passcode provided by a third party, wherein the encrypting is done before or after hashing the first file.

8. The computer implemented method according to claim 1, further comprising automatically displaying a file count data, wherein the file count data comprises the number of files stored on the distributed ledger associated with the first user with a verified file.

9. The computer implemented method according to claim 1, further comprising storing the first file on a portfolio database until permission is granted by the first user to allow a second user access to the file contents.

10. The computer implemented method according to claim 1, wherein the first timestamp is obtained from the distributed ledger.

11. The computer implemented method according to claim 1, further comprising applying a termination status identifier to the data in the first file and preventing access to the information found in the first file.

12. The computer implemented method according to claim 1, further comprising requesting a second set of permissions provided by a third user before verification.

13. The computer implemented method according to claim 1, wherein the hashing algorithm may comprise at least one of Message Digest Algorithm 5 (MD5), Secure Hash Algorithm 1 (SHA-1) SHA-2 family, SHA-3 family, Cyclic Redundancy Check (CRC32), and Argon2.

14. The computer implemented method according to claim 1, wherein at least a portion of the first file is obtained through the Financial Information exchange (FIX) protocol.

15. The computer implemented method according to claim 1, wherein the first file further comprises at least one of portfolio performance, portfolio attribution, and urgency to fill.

16. The computer implemented method according to claim 1, wherein verification further comprises:

converting the portfolio information into time series;

validating the portfolio information against auditable holdings data;

computing performance metrics based on the portfolio information to generate a verifiable factsheet;

And displaying the verifiable factsheet.

17. The computer implemented method according to claim 1, wherein verification further comprises:

searching the distributed ledger automatically in real time for the first file transaction ID found in the second file global variable set; and confirming no other global variable set associated with a distributed ledger entry contains the first transaction ID.

18. The computer implemented method according to claim 17, wherein the second file further comprises a copy of the first file and verification further comprises:

hashing the copy of the first file found in the second file using the same hashing algorithm applied to the first file to obtain a copy of the first file hash;

searching the distributed ledger automatically in real time for the presence of the copy of the first file hash.

19. A computing system comprising a processor for comparing files to determine file authenticity and maintain investment strategy confidentiality, the computing system performing the steps of:

algorithmically obtain a global variable set associated with a first user at a first time, the global variable set comprising name identifier, portfolio identifier, type, and global user metadata, and first file, wherein the first file comprises at least one of local user metadata and portfolio information, wherein the portfolio information comprises at least one of a set of holdings, orders and/or user notes;

hashing the first file using a hashing algorithm to obtain a first file hash;

algorithmically create a first file entry in a distributed ledger comprising the global variable set and the first file hash at a first time, wherein the creation of the first file entry in the distributed ledger creates a first timestamp associated with the first file entry and a first file transaction ID;

modifying the first file with a modified dataset, the modified dataset comprising secondary portfolio information different from the information stored in the first file entry to create a modified file;

hashing the modified file using the same hashing algorithm applied to the first file to obtain a modified file hash;

algorithmically create a second file entry in the distributed ledger at a third time, the second file entry comprising the global variable set, the modified file hash, and the first file transaction ID, wherein the creation of the second file entry in the distributed ledger creates a second timestamp associated with the second file entry;

algorithmically obtain a second file at a fourth time, the second file comprising a copy of the modified file;

verify the second file obtained at the fourth time matches the second file entry, wherein the second file obtained at the fourth time is verified by hashing the second file using the same hashing algorithm applied to the first file to obtain a second file hash and searching for the second file hash in the distributed ledger to obtain a verification status in real time;

wherein the verification status provides an indication of authenticity of the second file when the second file hash is determined to be present in the distributed ledger while allowing a user to maintain confidentiality of the first file and modified dataset from the first time until the fourth time;

obtain asset performance data associated with the portfolio information in the first file and modified dataset from a portfolio database;

generate a portfolio performance data set from the asset performance data and the second file; and cause the second file, the verification status, the portfolio performance data set, and the first and second timestamps to be displayed on a screen.

20. A computer readable medium comprising instructions that when executed by a processor enable the processor to:

algorithmically obtain a global variable set associated with a first user at a first time, the global variable set comprising name identifier, portfolio identifier, type, and global user metadata, and first file, wherein the first file comprises at least one of local user metadata and portfolio information, wherein the portfolio information comprises at least one of a set of holdings, orders and/or user notes;

hashing the first file using a hashing algorithm to obtain a first file hash;

algorithmically create a first file entry in a distributed ledger comprising the global variable set and the first file hash at a first time, wherein the creation of the first file entry in the distributed ledger creates a first timestamp associated with the first file entry and a first file transaction ID;

modifying the first file with a modified dataset, the modified dataset comprising secondary portfolio information different from the information stored in the first file entry to create a modified file;

hashing the modified file using the same hashing algorithm applied to the first file to obtain a modified file hash;

algorithmically create a second file entry in the distributed ledger at a third time, the second file entry comprising the global variable set, the modified file hash, and the first file transaction ID, wherein the creation of the second file entry in the distributed ledger creates a second timestamp associated with the second file entry;

algorithmically obtain a second file at a fourth time, the second file comprising a copy of the modified file;

verify the second file obtained at the fourth time matches the second file entry, wherein the second file obtained at the fourth time is verified by hashing the second file using the same hashing algorithm applied to the first file to obtain a second file hash and searching for the second file hash in the distributed ledger to obtain a verification status in real time;

wherein the verification status provides an indication of authenticity of the second file when the second file hash is determined to be present in the distributed ledger while allowing a user to maintain confidentiality of the first file and modified dataset from the first time until the fourth time;

obtain asset performance data associated with the portfolio information in the first file and modified dataset from a portfolio database;

generate a portfolio performance data set from the asset performance data and the second file; and cause the second file, the verification status, the portfolio performance data set, and the first and second timestamps to be displayed on a screen.

* * * * *